(12) United States Patent
Hufnagel et al.

(10) Patent No.: US 10,983,320 B2
(45) Date of Patent: Apr. 20, 2021

(54) OPTICAL ARRANGEMENT FOR IMAGING A SAMPLE

(71) Applicant: European Molecular Biology Laboratory, Heidelberg (DE)

(72) Inventors: Lars Hufnagel, Heidelberg (DE); Uros Krzic, Munich (DE)

(73) Assignee: EUROPEAN MOLECULAR BIOLOGY LABORATORY, Heidelberg (DE)

( * ) Notice: Subject to any disclaimer, the term of this patent is extended or adjusted under 35 U.S.C. 154(b) by 0 days.

(21) Appl. No.: 15/039,139

(22) PCT Filed: Nov. 24, 2014

(86) PCT No.: PCT/EP2014/075436
§ 371 (c)(1),
(2) Date: May 25, 2016

(87) PCT Pub. No.: WO2015/075246
PCT Pub. Date: May 28, 2015

(65) Prior Publication Data
US 2016/0363750 A1    Dec. 15, 2016

(30) Foreign Application Priority Data
Nov. 25, 2013   (GB) ...................................... 1320733

(51) Int. Cl.
G02B 21/00       (2006.01)
G02B 21/16       (2006.01)
(Continued)

(52) U.S. Cl.
CPC ..... *G02B 21/0032* (2013.01); *G02B 21/0076* (2013.01); *G02B 21/02* (2013.01);
(Continued)

(58) Field of Classification Search
CPC .... G02B 21/00; G02B 21/006; G02B 21/008; G02B 21/0032; G02B 21/0036;
(Continued)

(56) References Cited

U.S. PATENT DOCUMENTS

2005/0046849 A1* 3/2005 Cromwell .......... G01N 21/6408
356/417
2009/0174937 A1* 7/2009 Holy ...................... G02B 21/08
359/382

(Continued)

FOREIGN PATENT DOCUMENTS

CA        2233507 A1     3/1999
CN        102455501      5/2012
(Continued)

*Primary Examiner* — William R Alexander
*Assistant Examiner* — Ephrem Z Mebrahtu
(74) *Attorney, Agent, or Firm* — 24IP Law Group USA, PLLC; Timothy Dewitt

(57) ABSTRACT

An optical arrangement (10) for imaging a sample (20). The arrangement comprises an illumination objective lens (30) for producing an illumination beam (40) and a detection objective lens (50) for imaging radiation (60) from the sample (20). The illumination objective lens (30) is arranged at a non-perpendicular angle to the detection objective lens (50).

13 Claims, 2 Drawing Sheets

(51) Int. Cl.
*G02B 21/36* (2006.01)
*G02B 21/02* (2006.01)

(52) U.S. Cl.
CPC .......... *G02B 21/16* (2013.01); *G02B 21/365* (2013.01); *G02B 21/367* (2013.01)

(58) Field of Classification Search
CPC .............. G02B 21/0048; G02B 21/0076; G02B 21/02; G02B 21/06; G02B 21/16; G02B 21/26; G02B 21/365; G02B 21/367; G02B 21/0052; G02B 21/04; G01N 21/6458
See application file for complete search history.

(56) References Cited

U.S. PATENT DOCUMENTS

| | | | | |
|---|---|---|---|---|
| 2012/0049087 A1* | 3/2012 | Choi | ............ | G02B 21/367 250/459.1 |
| 2012/0099190 A1* | 4/2012 | Knebel | ............ | G02B 21/002 359/385 |
| 2012/0195544 A1* | 8/2012 | Shen | ............ | H04B 10/677 385/3 |
| 2012/0320438 A1* | 12/2012 | Knebel | ............ | G02B 21/0032 359/205.1 |
| 2014/0247502 A1* | 9/2014 | Bauer | ............ | G02B 21/02 359/656 |
| 2015/0253560 A1* | 9/2015 | Otte | ............ | G02B 21/0032 359/385 |
| 2018/0188179 A1* | 7/2018 | Keller | ............ | G01N 33/4833 |

FOREIGN PATENT DOCUMENTS

| | | |
|---|---|---|
| CN | 102830488 | 12/2012 |
| DE | 101 34 458 A1 | 2/2003 |
| DE | 10 2005 027 077 A1 | 5/2006 |
| DE | 10 2011 000 835 A | 8/2012 |
| EP | 1 019 769 B1 | 9/2004 |
| JP | H10170829 A | 6/1998 |
| JP | 2013003585 A | 1/2013 |
| WO | 2012/122027 A2 | 9/2012 |
| WO | 2014/063754 | 5/2014 |

\* cited by examiner

OPTICAL ARRANGEMENT FOR IMAGING A SAMPLE

CROSS-REFERENCE TO RELATED APPLICATIONS

This application claims priority to and benefit of UK Patent Application No. 1320733.7 filed on 25 Nov. 2013.

FIELD OF THE INVENTION

The field of the invention relates to an optical arrangement for imaging a sample

BACKGROUND OF THE INVENTION

A microscope is a scientific instrument that is used to image objects, which either are too small themselves or have details that are too small to be visible to the naked eye. There are many types of microscopes available on the market. The most common of these and the first to be invented is the so-called optical microscope, which uses light in a system of lenses to magnify images of the samples. The image from the optical microscope can be either viewed through an eyepiece or, more commonly nowadays, captured by a light-sensitive camera to generate a so-called micrograph. The images were previously captured on photographic film, but modern developments in charge-coupled device (CCD) cameras allow the capture and storage of digital images.

The illumination sources used in optical microscopes have been developed over the years and wide varieties of illumination sources are currently available, which can emit light or other types of radiation at different wavelengths. Optical filters can be placed between the illumination source and the sample to be imaged in order to restrict the wavelength of the radiation illuminating the sample.

Modern biological microscopy uses fluorescent probes for imaging specific structures within a cell as the sample. In contrast to normal trans-illuminated light microscopy, the sample in fluorescence microscopy is illuminated through an objective lens with a narrow set of light wavelengths. These narrow set of light wavelengths interact with fluorophores in the sample, which then emit light of a different wavelength. This emitted/fluoresced light is used to construct the image of the sample.

European Patent EP 1 019 769 (Carl Zeiss Jena) teaches a compact confocal theta microscope which can be used as a microscope with single objective or dual-objective system. The microscope has separate directions of illumination and detection, whereby the direction of detection in the objective is inclined at a set angle in relation to the direction of illumination. The set angle is chosen such that the area of overlap of the illumination cone and detection cone is reduced in comparison with a conventional confocal microscope. In the optical path between the objective and an image plane of the microscope, a beam splitter or reflector is positioned for injecting the illumination light and/or coupling out the detection light. The microscope disclosed in this patent uses point illumination.

The optical performance of a typical light-sheet microscope is limited by geometrical constraints imposed by physical dimensions of the illumination objective lens and the detection objective lens. The optical performance (contrast, optical resolution and light collection) of the light-sheet microscope depends on the numerical aperture (NA) of the illumination objective lens and the detection objective lens.

FIGS. 1a and 1b show an example of the light-sheet microscope, as known in the art. An illumination objective lens 30 produces an illumination beam 40, which illuminates a sample 20. Radiation 60 is reflected or fluoresced from the sample 20 and enters the detection objective lens 50, where it is measured using a detector (not shown) and images are generated in a computer (not shown). Detectors used are typically CCD detectors.

The numerical aperture (NA) of the detection objective lens 50 defines the maximum cone of light that can enter the detection lens 50. The numerical aperture is defined as follows: NA=n*sin ($\theta_{det}$). The refractive index n=1.33 (water) for most light-sheet microscopes. $\theta_{det}$ is the half angle of the maximum cone of light that can enter or exit the detection objective lens 50.

The illumination light cone 35 of the illumination objective lens 30 and the detection light cone 55 of the detection objective lens 50 may not overlap for perpendicular light-sheets arrangements. In other words, the angle $\theta_{ill}$ (half angle of the illumination light cone 35) and $\theta_{det}$ (half angle of the detection light cone 55) must be less than 90°. The mechanical housing of the detection objective lens 50 and the illumination objective lens 30 usually occupy a significantly larger cone than that which is needed for a specific value of the numerical aperture. This results in an arrangement of the illumination objective lens 30 and the detection objective lens 50, which may be sub-optimal.

International Patent Application No. WO 2014/063764 A1 (Karlsruhe Institut für Technologie) teaches a microscope with an illuminating lens mounted on or above a sample table. The illuminating lens guides at least one illuminating beam in the form of a two-dimensional light sheet to illuminate a sample under examination that is on the sample table. At least one detection objective lens is mounted underneath the sample and detects a detection beam being reflected or emitted from the sample under examination. The optical axis of the illumination lens is arranged at an angle, greater than 90° with respect to the optical axis of the detection objective lens. The illuminating beam is preferably incident upon the illuminating lens outside of the optical axis of the illuminating lens at an incident angle, such that the light sheet lies within the focusing plane of the detection objective.

The arrangement of this microscope requires a high degree of precision in the arrangement of the sample, source of the illuminating beam and the detection lens to ensure that the images of the sample can be accurately recorded by a camera.

US Patent Publication No. US 2012/0320438 A1 (Knebel et. al. assigned to Leica Microsystems GmbH) also teaches a scanning microscope that includes a light source, illumination optics and a scanning device for moving the illumination focus across a target region and in doing so by varying the direction of incidence in which the illuminating beam enters the entrance pupil of the illumination optics. The illuminating lens and the detection objective lens are mounted at an acute angle (of less than 90°) to each other, above the sample table and lie in a plane perpendicular to the plane of the sample table.

SUMMARY OF THE INVENTION

The disclosure teaches an optical arrangement for imaging a sample, which is mounted in a sample mount. The optical arrangement comprises an illumination objective lens for producing an illumination and a detection objective lens for imaging radiation from the sample. The illumination objective lens and the detection objective lens are arranged about the sample mount at an obtuse angle (greater than 90°) to each other. In one aspect of the disclosure, the illumination is in the form of a one-dimensional line projected onto the sample.

The illumination objective lens and the detection objective lens are located in a substantially horizontal plane.

In one aspect of the disclosure the optical arrangement further comprises a camera positioned in a direction normal to the plane of the illumination objective lens and the detection objective lens which co-operates with a translatable illumination beam generator, located in the back plane of the illumination objective lens to ensure that the sample is illuminated with the illumination light sheet parallel to the optical axis of the detection objective lens. A control processor is connected to both the camera and the translatable illumination beam generator to act as a feedback loop so that the illumination light sheet is in the correct position.

A further aspect of the disclosure has a further detection lens, which is arranged at a further non-perpendicular angle to the illumination lens. In this further aspect, the further detection lens, the detection objective lens and the illumination objective lens are arranged approximately equiangular angle to each other.

The objective lenses can be alternatively used as an illumination objective lens or a detection objective lens.

DESCRIPTION OF THE FIGURES

FIG. 1a is an overview and FIG. 1b is an exploded view of the light cones of the detection objective lens and the illumination objective lens.

FIG. 2a is an overview of the optical arrangement. FIG. 2b shows an exploded view of the light cones from the illumination objective lens and the detection objective lens.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
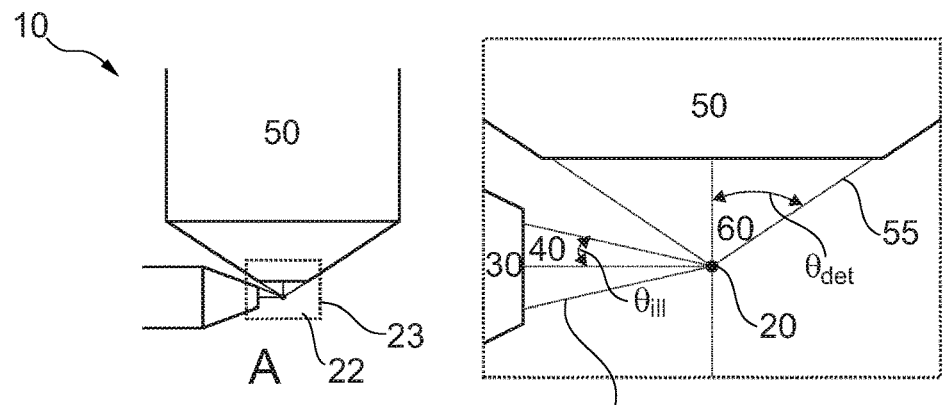
FIG. 1 shows an optical arrangement, as known in the art.
Figure 2:
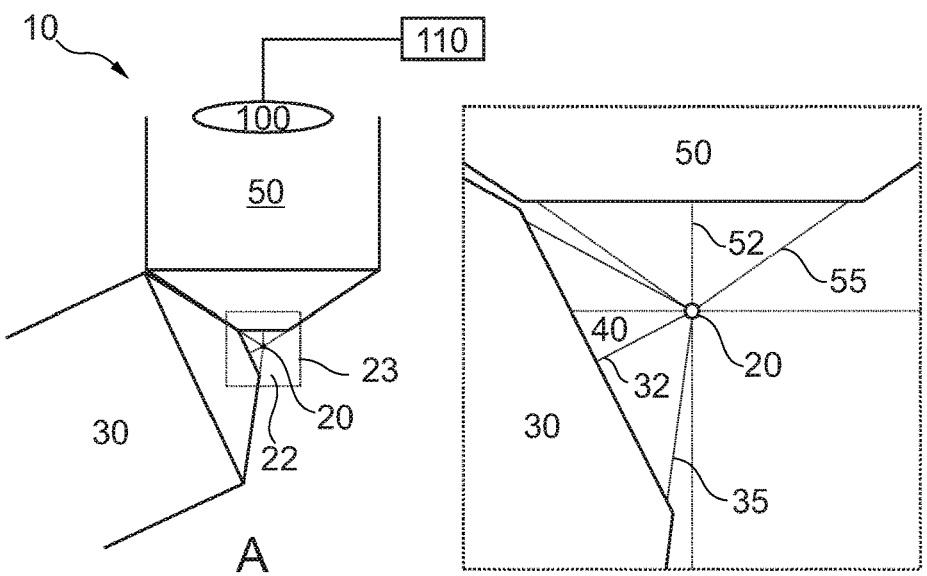
FIG. 2 shows an optical arrangement of this disclosure.

FIG. 2a shows an example of an optical arrangement 10 according to one aspect of this disclosure. An illumination objective lens 30 generates an illumination light sheet 40, which illuminates a sample 20 in a sample mount 23. The illumination objective lens 30 has an illumination light cone 35 and a central axis 32. A detection objective lens 50 receives radiated or fluoresced radiation from the sample 20 within a detection light cone 55 and has an axis 52. The illumination objective lens 30 and the detection objective lens 50 are both immersed in the same chamber with the same immersion medium 22 and are arranged around the sample mount 23 (which does not separate the immersion media 22 of the illumination objective lens 30 and the detection objective lens 50). FIG. 2b shows an exploded view of the area about the sample 20. It can be seen that the illumination objective lens 30 is arranged at a non-perpendicular angle to the detection objective lens 50. In particular, the plane of the illumination light-sheet 40 is at a non-perpendicular angle to the central axis 52 of the detection objective lens 50. The non-perpendicular axis is greater than 90 degrees. In another aspect, of the invention, the illumination objective lens 30 generates a line or an array of lines (one-dimensional illumination), which can be scanned across the sample 20 by moving the sample mount 23.

The sample 20 is immersed in an immersion medium 22 and is mounted on a sample mount 23. The immersion medium 22 and the material from which the sample mount 23 are made have the same refractive index. In one non-limiting example of the optical arrangement 10, the immersion medium 22 is water and the material of the sample mount 23 is fluorinated ethylene propylene (FEP).

The reflected or fluoresced radiation entering the detection objective lens 50 is imaged on a detector 100 and the images are processed in a processor 110 connected to the detector 100. The detector can be a CCD detector, but this is not limiting of the invention.

Figure 3:
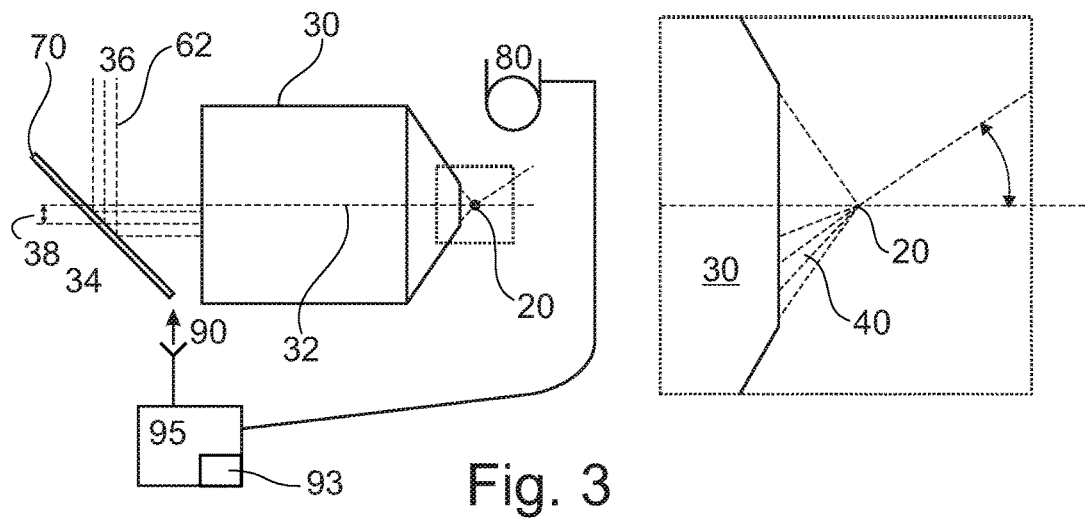
FIG. 3 shows an example of a light source being reflected into the illumination objective lens.

FIG. 3 shows the illumination objective lens 30 in more detail. A radiation source 36 generates a light pattern 62 at the back focal plane 34 of the illumination objective lens 30. This light pattern 62 results in a light-sheet 40 or a scanned line at the sample 20.

A moveable mirror 70 reflects the light pattern 62 from the radiation source 36 into the rear of the illumination objective lens 30 at an off-centre direction 38, which is off the central axis 32 of the illumination objective lens 30. The moveable mirror 70 can be translated in a direction lying in a plane formed by the illumination path of the light pattern 62 and the reflected light path along the central axis 32 of the illumination objective lens 30 to change the direction at which the light pattern 62 is reflected into the rear of the illumination objective lens 30. The translation of the light pattern 62 in the back focal plane 34 causes the light-sheet (or scanned line) 40 to rotate in object space such that the light sheet 40 at the sample 20 illuminates the sample 20 at an angle substantially perpendicular to the central axis 52 of the detection objective lens 50. This translation of the moveable mirror 70 can be controlled either manually or by use of a motorised stage 90.

The alignment of the light-sheet 40 (or the scanned line) is monitored by a camera 80 that is positioned perpendicularly to the plane of both of the illumination objective lens 30 and the detection objective lens 50.

The camera 80 images the illumination beam either by fluorescence emission of a fluorophore solution or by light scattering in the immersion medium 22 (normally water, as noted above, but also, for example, air or oil) of the sample 20. Automatic image analysis run by a control processor 95 connected to the camera 80 and to the motorised stage 90 can be used to determine an angular difference between an illumination plane and a camera object plane. This angular difference can be minimized by a computer control loop 93.

Example 1

Nikon 25× (or 100×) detection objective lenses 50 and illumination objective lenses 30 are used. The angle between the central axis 32 of the illumination objective lens 30 and the central axis 52 of the detection objective lens 50 was 120°. A standard light-sheet setup for illumination had an NA value of 0.3. A tilted light-sheet setup according to the teachings of this disclosure had a numerical aperture of 0.6.

Example 2

A Nikon 25× (or 100×) detection objective lens 50 was used with a 16×illumination objective lens 30. The angle between the central axis 32 of the illumination objective lens 30 and the axis 52 of the detection objective lens 50 was 105°. A light sheet using the optical arrangement 10 of this disclosure had a numerical aperture of 0.6, compared to a numerical aperture of point 0.3 for the optical arrangement of the prior art.

Example 3

Figure 4:
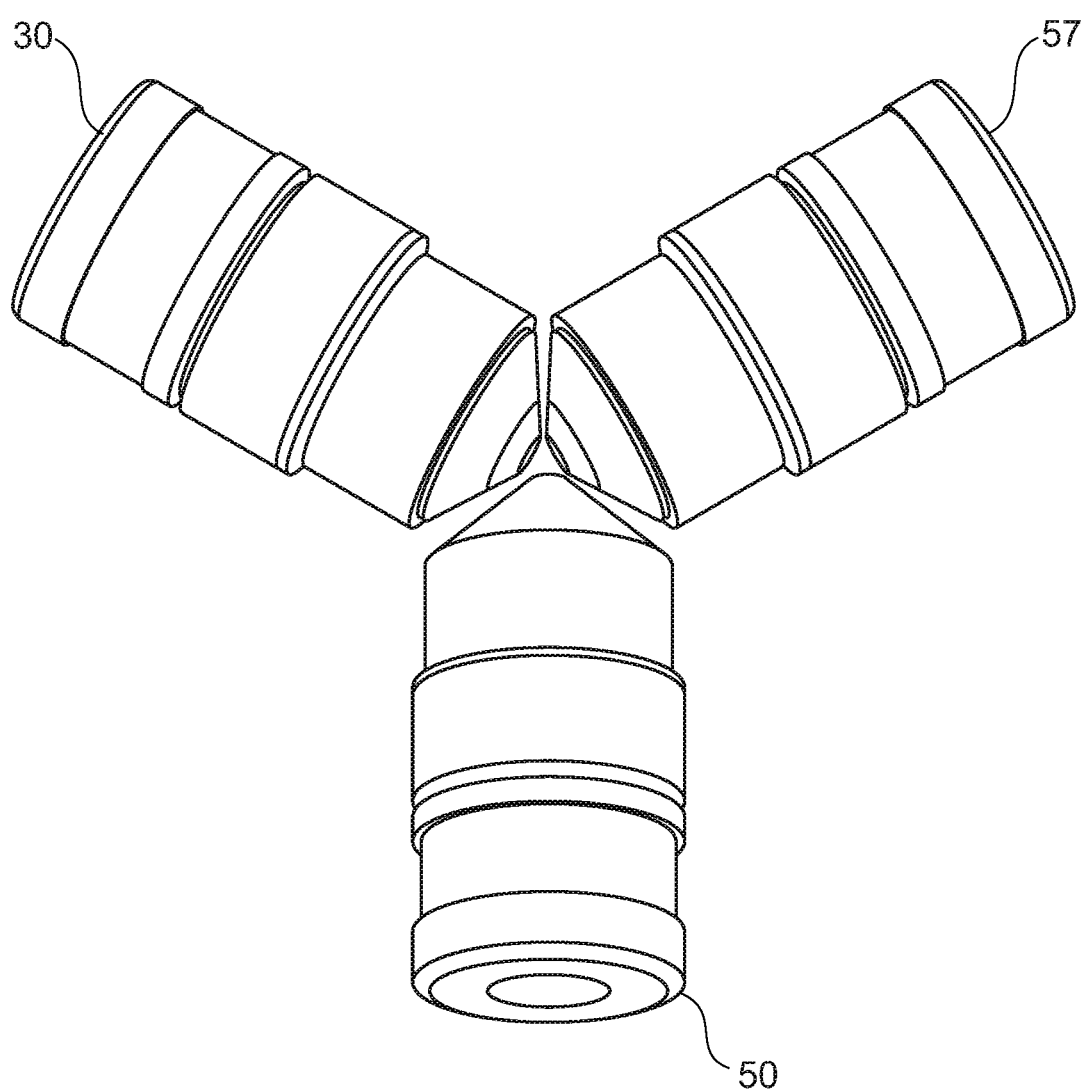
FIG. 4 shows an example of three objective lenses that can be used as both illumination objective lenses and detection objective lenses.

Nikon 25× (or 100×) objective lenses were used alternatively as detection objective lenses 50 and illumination objective lenses 30. This yielded in total six views of the same sample 20, without rotating or otherwise moving the sample 20. The six different images can then be processed in a computer to obtain a three-dimensional view of the sample or of the tasks. This is shown in FIG. 4 in which a further objective lens 57 is shown and the three objective lenses 30, 50 and 57 are arranged at substantially 120° to each other. The further objective lens 57 is also mounted in the same plane as the detection objective lens 50 and the illumination objective lens 30.

REFERENCE NUMERALS

- 10 Optical arrangement
- 20 Sample
- 22 Immersion medium
- 23 Sample mount
- 30 Illumination objective lens
- 32 Central axis
- 34 Back focal plane
- 36 Source
- 38 Off-centre direction
- 40 Illumination light sheet
- 50 Detection objective lens
- 52 Axis
- 55 Detection light cone
- 57 Further objective lens
- 60 Radiation source
- 62 Light pattern
- 70 Moveable mirror
- 80 Camera
- 90 Motorised stage
- 95 Control processor
- 100 Detector
- 110 Image processor

The invention claimed is:

1. An optical arrangement for imaging a sample mounted on a sample mount comprising:
    a radiation source for generating a light-pattern;
    an illumination objective lens for producing from the light-pattern an illumination of a sample;
    a detection objective lens for imaging radiation from the sample;
    a moveable mirror that is translatable for changing direction of light pattern reflection, including an off-center direction off of the central axis of the illumination objective lens, at which direction of light pattern reflection the light pattern is reflected along the central axis of the illumination objective lens into the illumination objective lens to rotate the illumination, such that, due to the rotation, the illumination is positioned perpendicular to a central axis of the detection objective lens; whereby the illumination objective lens is arranged about the sample mount at an obtuse angle to the detection objective lens about the sample mount.

2. The optical arrangement of claim 1, wherein the illumination objective lens and the detection objective lens are located in a-horizontal plane.

3. The optical arrangement of claim 1, further comprising a camera positioned in a direction normal to the plane of the illumination objective lens and the detection objective lens.

4. The optical arrangement of claim 1, wherein the movable mirror is translatable by means of a motorized stage.

5. The optical arrangement of claim 3, further comprising a control processor connected to at least one of the camera or the motorized stage.

6. The optical arrangement of claim 1, further comprising a further detection lens arranged at a non-perpendicular angle to the illumination lens about the sample mount.

7. The optical arrangement of claim 1, comprising a plurality of objective lenses which can be alternately used as an illumination objective lens and a detection objective lens.

8. The optical arrangement of claim 7, wherein three of the plurality of objective lenses are arranged at approximately 120° to each other form the plurality of objective lenses.

9. The optical arrangement of claim 1, further comprising an image processor connected to a detector.

10. The optical arrangement of claim 1, wherein the illumination is in the form of a light-sheet or at least one one-dimensional line projected onto the sample.

11. A method for imaging a sample in an optical arrangement comprising a radiation source for generating a light-pattern, an illumination objective lens for producing from the light-pattern an illumination of a sample, a detection objective lens for imaging radiation from the sample in an immersion medium, and a moveable mirror for changing direction of light pattern reflection, including an off-center direction off of the central axis of the illumination objective lens, at which direction of light pattern reflection the light-pattern is reflected along the central axis of the illumination objective lens into the illumination objective lens to rotate the illumination, such that, due to the rotation, the illumination is positioned perpendicular to a central axis of the detection objective lens, wherein the illumination objective lens and the detection objective lens are arranged at an obtuse angle to each other, the method comprising:
    generating a light-pattern;
    producing with the illumination objective lens an illumination from the light pattern;
    directing the light-pattern into the rear of the illumination objective lens;
    monitoring radiation from the sample; and
    changing the direction, at which the light-pattern is reflected into the illumination objective lens.

12. The method of claim 11, wherein the radiation from the sample is imaged by a camera which provides signals to a control processor and the control processor controls the directing of the light-pattern.

13. The method of claim 12, wherein the control processor controls the position of the moveable mirror.

* * * * *